June 29, 1954
W. B. RETZ
2,682,327
SPINDLE CLUTCH
Filed June 4, 1947
3 Sheets-Sheet 1
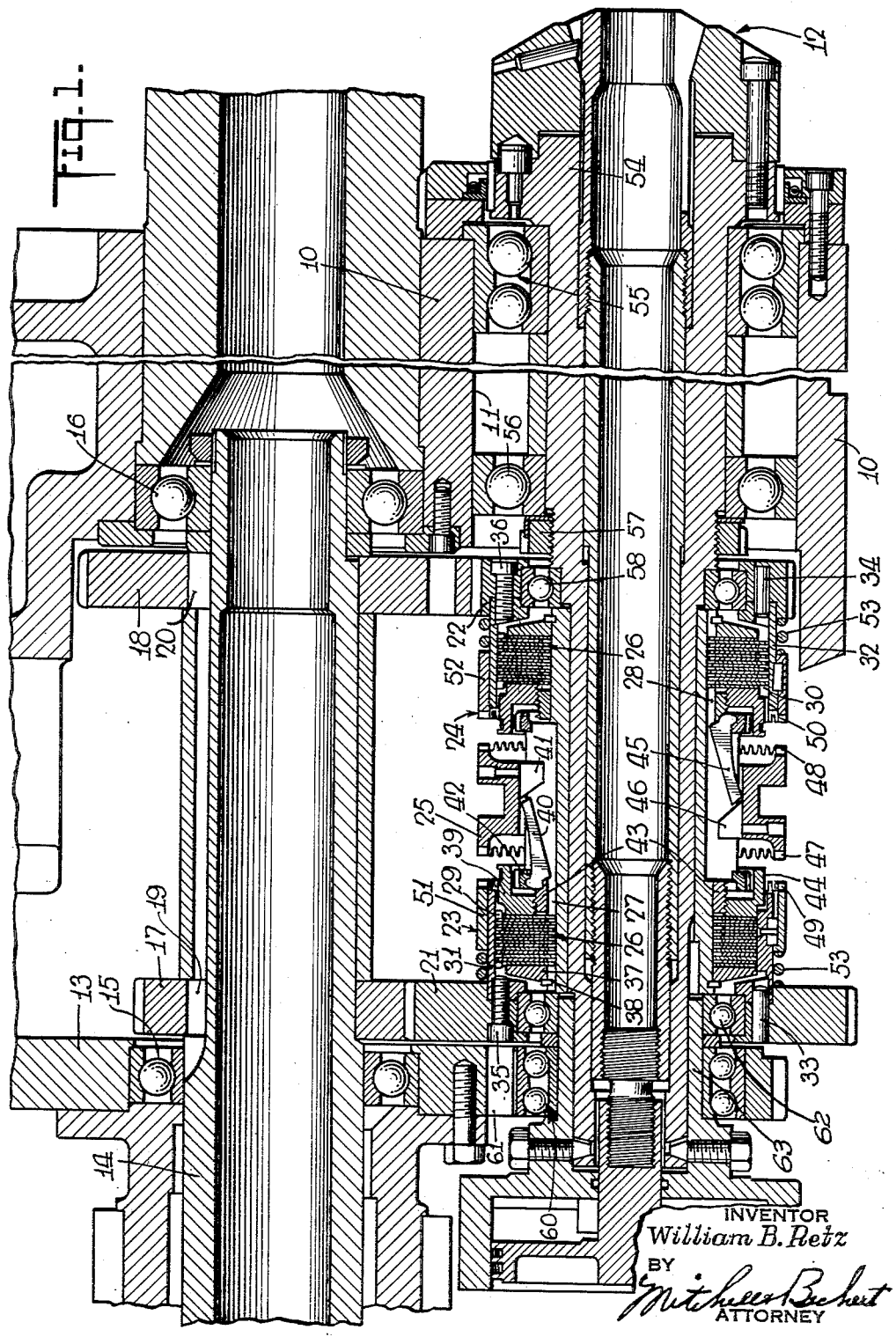
INVENTOR
William B. Retz
BY
Mitchell Bechert
ATTORNEY June 29, 1954  W. B. RETZ  2,682,327
SPINDLE CLUTCH
Filed June 4, 1947  3 Sheets-Sheet 2
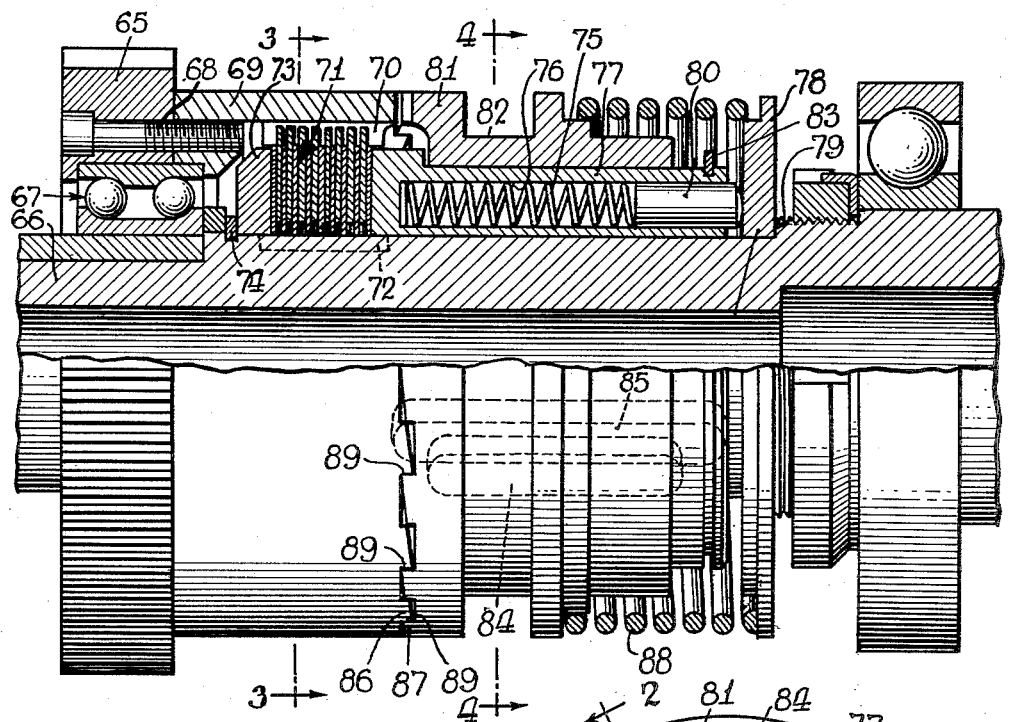
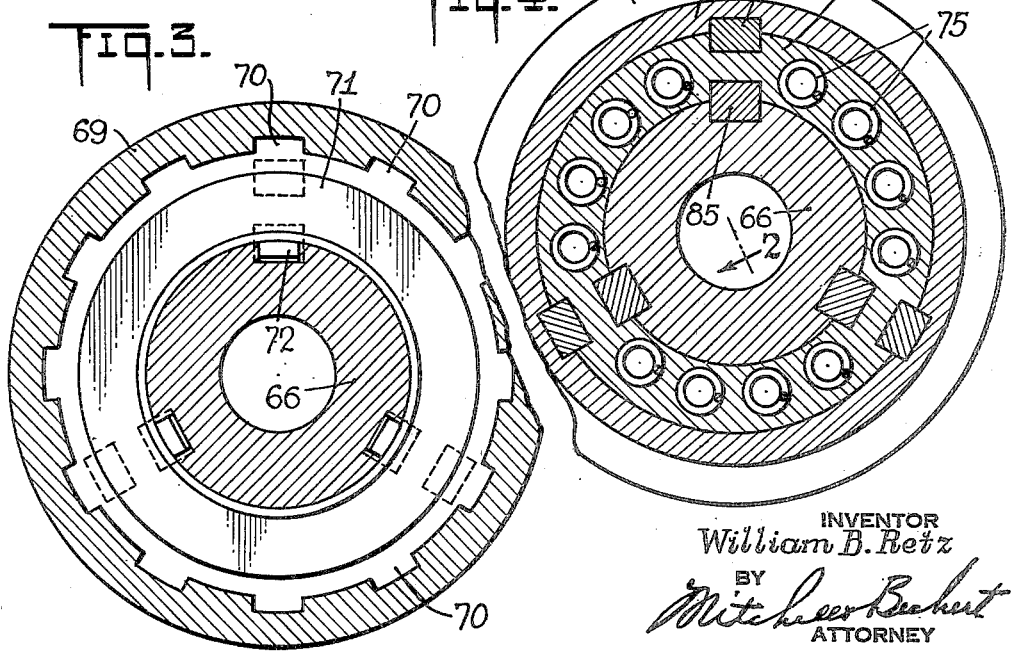
INVENTOR
William B. Retz
BY
Mitchell Bechert
ATTORNEY June 29, 1954  W. B. RETZ  2,682,327
SPINDLE CLUTCH
Filed June 4, 1947  3 Sheets-Sheet 3
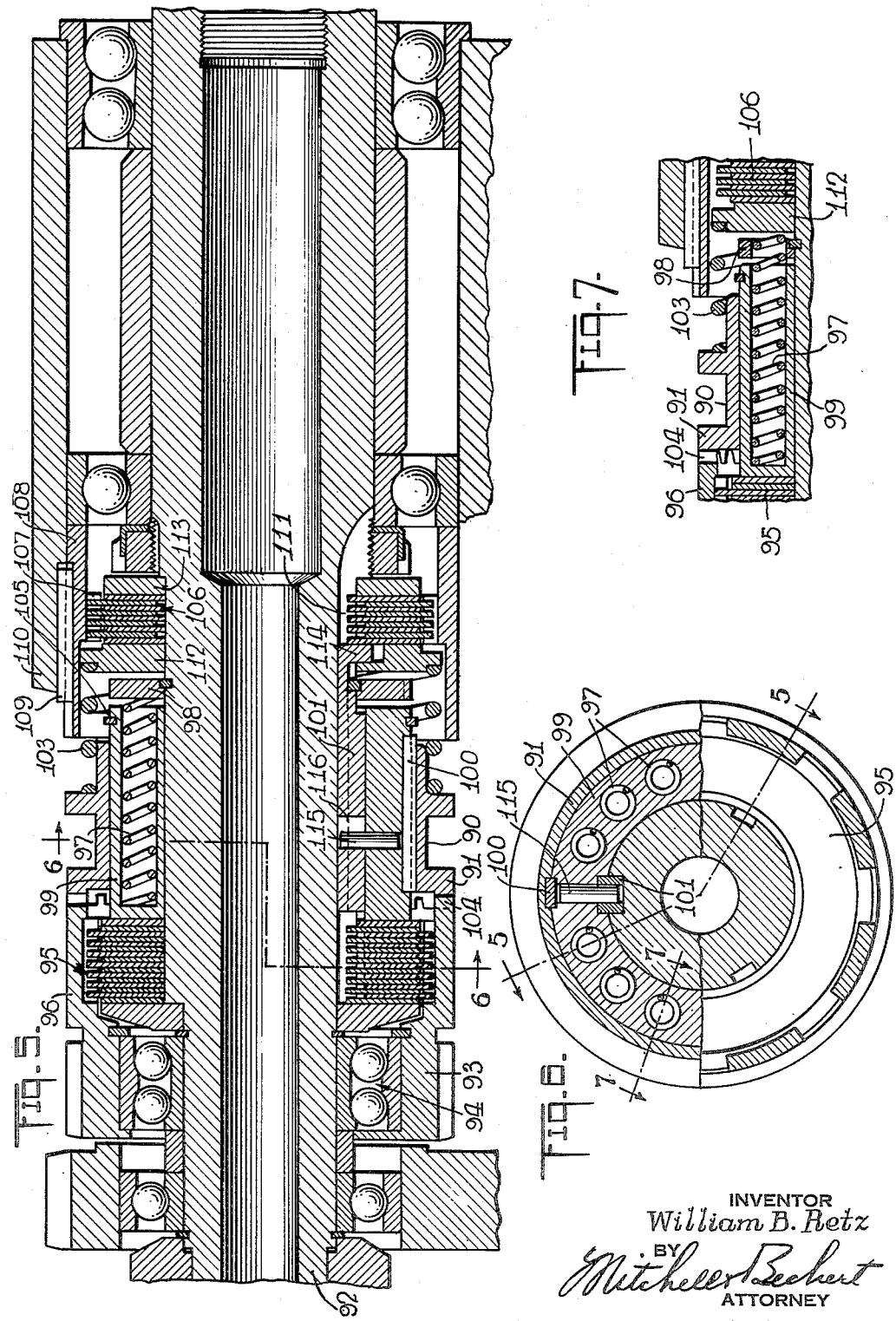
INVENTOR
William B. Retz
BY
Mitchell Bechert
ATTORNEY Patented June 29, 1954

2,682,327

UNITED STATES PATENT OFFICE 2,682,327

SPINDLE CLUTCH

William B. Retz, Plainville, Conn., assignor to The New Britain Machine Company, New Britain, Conn., a corporation of Connecticut Application June 4, 1947, Serial No. 752,358

10 Claims. (Cl. 192—4)

My invention relates to speed-control mechanisms for spindle machines, and in particular to speed-control means for a spindle on a multiple-spindle machine.

It is an object of my invention to provide an improved device of the character indicated.

It is another object to provide an improved spindle assembly incorporating a desired assortment of clutches and/or brakes for slidable insertion into a spindle mounting as a complete unit.

It is a further object to provide an improved spindle-speed-selection mechanism for a machine of the character indicated.

It is in general an object of my invention to obtain the above objects with a mechanism which inherently tends to absorb shocks due to changing speeds, which may provide positive drives, and which is relatively easy to maintain and to service.

Other objects and various further features of the invention will be pointed out or will occur to those skilled in the art from a reading of the following specification in connection with the accompanying drawings. In said drawings:

Fig. 1 is a partly broken-away cross-sectional view of a spindle assembly incorporating features of the invention, shown in application to a multiple-spindle machine;

Fig. 2 is a partly sectionalized fragmentary side view of another mechanism incorporating features of the invention;

Fig. 3 is a sectional view taken in the plane 3—3 of Fig. 2;

Fig. 4 is a sectional view taken in the plane 4—4 of Fig. 2;

Fig. 5 is a longitudinal sectional view of still another spindle assembly incorporating features of the invention;

Fig. 6 is a broken sectional view taken substantially in the two planes represented by the line 6—6 of Fig. 5; and Fig. 7 is a fragmentary view of a part of the arrangement of Fig. 5, taken as a section in the plane 7—7 of Fig. 6.

Briefly stated, my invention contemplates an improved spindle assembly which in a preferred form may unitarily incorporate certain rotary drive parts as well as clutching means for operatively connecting the drive parts to the spindle. In one of the forms to be described, a spindle assembly may include two separate speed-control or drive members, and clutching means for selectably engaging said drive members to the spindle. In another form, the spindle assembly may include a drive member and a brake member and clutch means for selectably driving and braking the spindle. The clutches for initiating or for changing speeds of rotation of the spindle are of the friction type. Positive clutches are provided for driving the spindle after rotation is initiated or otherwise changed by actuation of the friction clutch.

Referring to Fig. 1 of the drawings, my invention is shown in application to a multiple-spindle machine having a spindle carrier 10 with a plurality of bores such as the bore 11 to receive and support a plurality of spindles such as the spindle 12. In the form shown, the spindle carrier 10 is indexible, and indexing motion may be imparted to the spindle carrier 10 by means of suitable gearing and other mechanisms (not shown) meshing with an indexing wheel 13 at the rear end of the spindle carrier 10. Rotary drive for the spindles 12 may be supplied through a shaft 14 concentric with the spindle carrier 10 and supported therein as by means of spaced antifriction bearings 15—16. In the form shown, spaced drive gears 17—18 are keyed to the shaft 14 as at 19—20.

In accordance with a feature of the invention, the drive gears 17—18 may be of different sizes, so as to mesh with gears 21—22 carried by the spindle 12 and to provide different drive speeds for the spindle 12. A first clutching mechanism 23 may serve to engage the drive gear 21 to the spindle 12, and a second clutching mechanism 24 may serve to engage the drive gear 22 to the spindle 12. An actuating member 25 in the form of a sleeve may be longitudinally slidable along the spindle assembly for selectable engagement of either of the clutches 23—24.

In the form shown, the clutches 23—24 each comprise a plurality of clutch discs 26 alternately keyed as at 27—28 to the spindle 12 and as at 29—30 to annular members or parts 31—32, which in turn are carried by the respective drive gears 21—22. The annular members 31—32 may be removably secured to the gears on which they are mounted, as by means of locating pins 33—34 and cap screws 35—36. In the case of both clutches 23—24, one end (and preferably the end further from the actuating sleeve 25) may abut an abutment ring 37 which may be positively located on the spindle 12 by means of a locking or snap ring 38. At the other end of the clutch plates 26, that is, at the end preferably closer to the actuating sleeve 25, is a disc-engaging member 39 to be actuated by a cam-follower lever 40.

The cam-follower lever 40 includes a finger which may ride along or over a cam 41 on the actuating sleeve 25, and which with a leftward (in the sense of Fig. 1) displacement of sleeve 25 may cause clockwise rotation of the said lever 40. The other end of the lever 40 may include an enlarged head to engage a fixed member 42 and a displaceable member 43. The displaceable member 43 may be formed with the member 39 which abuts the clutch plates or discs 36, but in the preferred form shown these members (43—39) are threadedly engaged for purposes of adjustment. The actuating sleeve is preferably keyed to the spindle 12 and, if desired, cam 41 may serve as a key by having it ride in a longitudinal keyway or slot on the spindle.

It will be understood that if the member 43 is keyed to the spindle 12 as shown, a spanner adjustment as at 44 on the member 39 will serve to position the member 39 for most effective actuation by the lever 40. A certain amount of such adjustment at the point 44 may be necessary with wear of the clutch plates 26.

Although the above description has concerned itself primarily with the clutch 23 for engaging drive gear 21 to the spindle 12, it will be appreciated that the clutch 24 may be of similar construction. The clutch 24, therefore, preferably includes a clutch-actuating lever 45 to ride on a cam 46, which may also be formed with the sleeve 25. Cam 46 may also serve as an additional means for keying the actuating sleeve 25 to spindle 12. Both clutches 23—24 are preferably disengaged in the central position shown for the actuating sleeve 25.

In accordance with the invention, locking means or positive clutch means are provided to back up or to supplement the above-described frictional clutch engagement for one or for both of the clutched relationships. To this end, positive locking means in the form of clutch teeth or projections 47—48 may be provided on each longitudinal end of the clutch-actuating sleeve 25, these projections serving to lock with corresponding projections 49—50 carried by the respective drive members 21—22. The positive locking engagements may be direct or preferably, as shown, through a resilient connection. In order to accomplish such resilient connection, the projections 49—50 may be formed on separate sleeves 51—52 riding on the annular members 31—32 and keyed thereto. Large coil springs 53 serve resiliently to displace the sleeves 51—52 from their respective drive members 21—22.

I prefer that the relative locations of the cams 41—46 with respect to the positive-clutch elements 44—47 and 48—50 be such that for actuating displacement of sleeve 25 say to the left, the actuating lever 40 will be depressed so as to squeeze the clutch plates 26 and thus frictionally to drive spindle 12 through the gear train 17—21 prior to positive engagement of the projections 47—49. Positive engagement by way of the locking means 47—49 need thus be effected only after spindle 12 has or has nearly reached the desired drive speed. In a similar way, the spindle 12 may be driven through the gear train 18—22 by a sliding displacement of the sleeve 25 to the right, to cause first a declutching of clutch 23, then a frictional clutching via the plates 26 of the clutch 24, and finally a positive engagement through locking elements 48—50.

In accordance with a feature of the invention, the above-described assembly with its novel features of construction may be made substantially wholly apart from the spindle carrier 10 in which it may ultimately be received. By a proper choice of outer diameters or other dimensions of the locking sleeves 51—52, of the actuating sleeve 25, and of the gear 22, the entire spindle assembly 12 may be received within the bore 11 of the spindle carrier 10. Such a spindle assembly may then comprise the spindle body 54, antifriction bearings 55—56 for the front end of the spindle 12, preloading means 57 for the bearings 56—55, antifriction bearing means 58 and drive gear 22 supported by said bearing means 58, the clutch 24 together with its actuating means 25, and the clutch discs 26 of clutch 23.

In a two-speed spindle drive as depicted in Fig. 1, one of the drive gears 22 is materially smaller than the other drive gear 21. I prefer that the smaller of these gears (22) be mounted for actuation by the clutch 24 so as to be accommodated in the spindle assembly which has just been described. The rearward or slow-speed gear 21 is thus likely to exceed the diameter of the bore 11 and must, therefore, be mounted to the spindle assembly 12 after insertion of the latter in the bore 11. In a preferred form, the slow-speed gear 21 is incorporated in another subassembly, which may include the annular drive member 31 fastened as by bolt 35 to gear 21 in such a way as to embrace the outer ring of bearing 62. This subassembly may also carry spring 53 and the outer sleeve sliding member 51. Assembly may thus be completed when the above-described subassembly is mounted on the chucking cylinder sleeve 63, and when the spindle assembly is locked to the subassembly, as at 29. The chucking cylinder sleeve 63 is shown supported in a double-row bearing 60 carried by the spindle-carrier index gear 13.

Referring now to Figs. 2, 3, and 4, I show an alternative spindle-clutching mechanism which may be adapted to perform substantially the same functions as described for one of the clutching mechanisms 23—24 of Fig. 1. In Fig. 2, however, the modification is shown as applied solely to the clutching in or out of a single drive, as provided by the gear 65. It will be understood that the gear 65 may, like the corresponding drive for the spindle 12 of Fig. 1, be revolubly supported by the main body 66 of the spindle to be driven, and that it may be spaced therefrom by antifriction bearing means 67. As in the case of the previously-described arrangement, the drive gear 65 may be secured as by screw 68 to an annular member 69 having key means 70 to engage a plurality of clutch plates or discs 71. The clutch plates 71 which are locked by the key means 70 are preferably interleaved with the clutch plates 71 which are locked to the spindle body 66, as by key means 72. Again, an abutment comprising a ring 73 and a snap member 74 may provide a positive backing for actuation of the clutch plates 71.

In accordance with features of the invention embodied in Fig. 2, resilient means normally urge the clutch plates 71 into frictional engagement. In the form shown, the resilient forces provided by this means are derived from a compression spring 75 and preferably from a plurality thereof, angularly spaced about a sleeve or body 77 and retained in bores 76 in said body 77. The springs 75 may directly cooperate with an abutment member 78 riding against a shoulder 79 on the spindle body 66. In the form shown, however, intermediate pins 80 are employed between the spring 75 and the abutment 78 in order to engage the latter.

The outer surface of the sleeve or body member 77 is preferably cylindrically formed so as to support an actuating sleeve or collar 81 for sliding displacement therealong. The actuating sleeve 81 may include an outer annular groove 82 to engage an actuating mechanism carried by other parts of the machine (not shown). Abutment means preferably cooperate between the actuating collar 81 and the sleeve or body member 77 so that, upon actuation of collar 81 to the right, the resilient force applied by sleeve 77 against the clutch plates 71 may be relieved. In the form shown, a simple snap ring 83 seated in a groove on the sleeve member 77 serves as such abutment means. The actuating collar 81 and the sleeve member 77 may be keyed to each other as at 84, and the sleeve 77 may be keyed to the spindle body 66 as at 85.

As in the case of Fig. 1 arrangement, the frictional clutching afforded by the clutch plates 71 of Fig. 2 is supplemented or backed up by a positive direct-drive connection from the drive gear 65 to the spindle 66. The locking engagement may again be effected by means of teeth or notches projecting longitudinally from the sleeve member 69 and from the actuating collar 81. In the form shown, these tooth-like projections (86 on the sleeve member 69, and 87 on the collar 81) are of special shape to provide a more readily established locking engagement therebetween. Preferably this engagement is promoted by the resilient action of a compression coil spring 88 cooperating between the abutment member 78 and a shoulder on the actuating collar 81.

In operation then, the clutching arrangement of Figs. 2, 3, and 4 is one to provide normal resiliently urged engagement of a direct drive from the gear 65 to the spindle 66. This engagement may be useful in driving the spindle at a desired constant speed for all spindle positions except one or perhaps two, at which positions it may be desired not to drive the spindle. For example, in the loading station it may be desirable not to rotate the spindle while loading. In such case, a suitable cam-controlled fork (not shown) may engage the groove 82 of collar 81 and temporarily actuate the same to the right against the compression of spring 88. Such actuation will be understood first to disengage the positive locking means 86—87, and then (by way of abutment 83) to relieve the resilient load of springs 75 of the clutch plates 71. When the action of springs 75 on clutch plates 71 is thus relieved, the spindle body will be permitted to stop. Once the spindle 66 has been indexed past the loading-station position, the fork engaging the collar 81 may release the same to permit first a resilient squeeze of the clutch plates 71 and then a resilient engagement of the locking means 86—87.

It will be appreciated that by angularly tapering or cutting off the projecting ends of the teeth 86—87 the full impact of the locking engagement may be minimized—thus prolonging life of the engaged parts. For example, if the spindle 66, during clutch disengagement, has been allowed to slow down from the drive speed, and if the driving motion is clockwise in the sense of Figs. 3 and 4, locking engagement may be effected positively over extended longitudinal surfaces 89 even for first locking contact and that the action of the spring 88 may be such as to complete this locking engagement in relatively short time.

In Figs. 5, 6, and 7, I show still another embodiment of the invention in which the spindle assembly may be made to incorporate both a desired spindle drive and a braking function. These functions may be selected by the action of suitable forks or other actuators (not shown) in an annular recess 90 formed outside an actuating collar 91.

In the form shown, drive for the spindle 92 of Fig. 5 is provided through a drive gear 93 supported on and spaced from the spindle 92 by antifriction bearing means 94. As in the case of the arrangement of Fig. 2, the drive gear 93 may be frictionally engaged to the spindle 92 by a system of clutch discs 95 keyed alternatively to the annular portion 96 of the drive gear 93 and to part of the spindle 92. Resilient means such as springs 97 may compressibly cooperate between an abutment member 98 and a sleeve member 99 normally to urge the clutch plates 95 together. The clutch-actuating collar 91 may again be keyed as at 100 to the sleeve member 99, which in turn may also be keyed as at 101 to the spindle body 92. Resilient means 103 may normally urge the actuating collar 91 to the left (in the sense of Fig. 5), that is, into direct and locking engagement with the annular portion 96 of the drive gear 93. Again, this direct positive engagement may be by locking means 104 generally similar to the locking means 86—87 of Fig. 2. An abutment or snap ring 105 on the sleeve member 99 may serve to relieve resilient means 97, and hence the clutched drive from gear 93, when the actuating collar 91 is displaced to the right.

In accordance with a feature of the invention, brake means may be effective to stop the spindle 92 coincidentally with disengagement of the clutch means 95, as by displacement of collar 91 to the right. In the form shown, such brake means may comprise a plurality of clutch plates 106 which may be alternatively keyed, as at 107, to a sleeve or other member 108 representing a relatively fixed part of the machine. In the form shown, the sleeve member 108 is keyed at 109 to the spindle carrier 110. Those clutch plates 106 which are not keyed to the spindle carrier by the described mechanism are preferably keyed as at 111 to the spindle 92. A ring or plate 112 may serve to receive the compression spring 103 and thus normally to urge itself against the braking clutch plates 106 and against an abutment ring 113 seated against a shoulder in the spindle body 92. It will thus be clear that with the mechanism described, brake clutch 106 will normally be urged to engage the spindle 92 to the spindle carrier.

It will be recalled that the resilient means 97 cooperating with the spring 103 also normally urges the drive clutch 95 into engagement. In order to provide a selective operation of the drive clutch 95 and of the brake clutch 106, the brake-actuation plate 112 and the drive-actuating sleeve 99 may be linked by a suitable lost-motion mechanism. In the form shown, this lost-motion mechanism is incorporated into the construction of key means 101. The key means 101 may include a finger 114 to engage the brake-actuating plate 112 and at the same time it may be pinned as at 115 to the drive-actuating sleeve 99. To provide the lost motion, the pin 115 may ride in a longitudinal slot 116 in the key means 101.

If the drive-actuating sleeve 99 and the brake-actuating plate 112 were resiliently spaced as by having compression springs 97 extend through the abutment 98 into engagement with the brake actuating plate 112, then it will be clear that a forcible actuation of the collar 91 to the right or to the left would be needed to effect the desired driving or braking engagement. Since the most usual connection will probably be a drive from the gear 93, I prefer that the resilient means 97—103 be so designed and arranged as normally to load the actuating collar 91 for leftward displacement, that is, for full engagement of the clutch 95 and of the positive locking means 104. For this reason the spring 103 is shown normally loading the actuating collar 91 for engagement of locking means 104, and a number of springs 97 directly abut the fixed abutment 98 for leftward loading of the drive clutch 95.

Although all the described forms of my invention have incorporated positive-clutching means for assuring a given selected spindle speed, it will be clear that the arrangements are all such as not to effect the positive or locking engagement until the friction-clutching means has brought spindle rotation to, or very nearly to, the desired speed. For example, in the case of relatively new and unworm friction-clutch elements, there may be no slip between drive elements and the spindle; and in any of the described arrangements no drive forces need be (or probably will be) transmitted via the positive-locking means. On the other hand, in the presence of slip, as when clutch plates are worn, all arrangements are such as to effect positive spindle drives at least after the friction-clutch elements have had an opportunity partially to bring the spindle to the desired speed.

It will be appreciated that I have described relatively simple structures for providing a number of desired spindle speeds (including braked, or zero, speed). The nature of all of the preferred constructions is such that all parts which require painstaking assembly of relatively small elements may be assembled separately, as on a bench, for later installation as a complete changeable-speed spindle in its ultimate mounting. Such construction will be understood to permit rapid replacement of spindle assemblies, so that the down time of a machine may be a minimum.

While I have described my invention in detail for the preferred forms shown, it will be understood that modifications may be made within the scope of the claims which follow.

I claim:

1. In a machine of the character indicated, a spindle, multiple spindle-speed control means and clutch means for selectably engaging one of said multiple speeds to said spindle, said control means including first and second annular speed-control members coaxial with said spindle and spaced from each other, spaced first and second annular clutches symmetrical about said spindle, said first clutch including a first set of driving and driven friction elements engaging one of said speed-control members to said spindle, said second clutch including a second set of driving and driven friction elements engaging the other of said speed-control members to said spindle, first resilient means symmetrical about the spindle axis and in preloaded actuating relation with one of said clutches, second resilient means symmetrical about the spindle axis and in preloaded actuating relation with the other of said clutches, and common axially movable actuating means symmetrical about the spindle axis and including abutment means in selective direct relieving relation with said clutches against the preloaded action of said resilient means.

2. A machine according to claim 1, in which said abutment means incorporates a lost axial motion between the direct relief of one of said clutches and the direct relief of the other of said clutches.

3. A machine according to claim 1, and including resilient means symmetrical about the spindle axis and stressed axially against said common actuating means in the direction of engaging one of said clutches to the exclusion of the other.

4. A machine according to claim 1, in which one of said speed-control members is a drive member and the other of said speed-control members is rigidly associated with a relatively fixed part of the machine, whereby said other speed-control member in conjunction with said second clutch may serve as a brake for said spindle.

5. In a machine of the character indicated, a spindle, multiple spindle-speed control means and clutch means for selectably engaging one of said multiple speeds to said spindle, said control means including first and second annular speed-control members coaxial with said spindle and spaced from each other, first and second annular clutches symmetrical about said spindle, said first clutch including friction elements engaging one of said speed-control members to said spindle, said second clutch including friction elements engaging the other of said speed-control members to said spindle, first resilient means symmetrical about the spindle axis and in preloaded actuating relation with one of said clutches, second resilient means symmetrical about the spindle axis and in preloaded actuating relation with the other of said clutches, common axially movable actuating means symmetrical about the spindle axis and including abutment means in selective direct relieving relation with said clutches against the preloaded action of said resilient means, and positive-engaging means on said first speed-control means and on said common actuating means and engageable only after engagement of said first clutch and after relief of said second clutch.

6. A machine according to claim 5, and including resilient means symmetrical about the spindle axis and loading said common actuating means in the direction of positive engagement to said first speed-control member.

7. In a machine of the character indicated, a spindle, first and second axially spaced sets of disc-clutch elements coaxial with said spindle, outer limiting abutments on said spindle for the outer elements of said sets, drive means engaged to elements of one set, frame means engaged to elements of the other set, a first annular member keyed to said spindle between said sets and slidable to abut said first set, a second annular member keyed to said spindle between said sets and slidable to abut said second set, compressed resilient means radially confined by one of said annular members symmetrically about the spindle axis and stressed against both said annular members, abutment means holding said annular members axially against the action of said resilient means by an amount sufficient to assure against the simultaneous application of the full compressional force of said resilient means against both said sets, and common means for axially shifting said abutment means and symmetrical about the spindle axis.

8. In a machine of the character indicated, a spindle, first and second axially spaced sets of disc-clutch elements coaxial with the spindle, outer limiting abutments on said spindle for the outer elements of said sets, compressed resilient loading means symmetrical about the spindle axis and between said sets of elements and in actuating relation with both said sets, common axially movable actuating means keyed to said spindle and symmetrical about the axis of said spindle and including spaced axially movable abutment means in selectively engageable relation with the respective ends of said resilient means, whereby said sets may be selectively resiliently squeezed and relieved.

9. A machine according to claim 8, and including a spindle carrier with a spindle-receiving bore, said spindle and said sets of clutch elements and said actuating means all being parts of a spindle assembly and of a diameter less than the bore diameter, said spindle assembly also including drive means for one of said sets of clutch elements and of a diameter less than the bore diameter, and said assembly also including spaced bearing means on opposite sides of said drive means and of a diameter to fit said bore, whereby a spindle assembly including drive means therefor and clutch means and clutch-actuating means may be slidably inserted as a unit in said bore.

10. In a machine of the character indicated, a spindle, multiple spindle-speed control means and clutch means for selectably engaging one of said multiple speeds to said spindle, said control means including first and second annular speed-control members coaxial with said spindle and spaced from each other, a positive clutch and first and second annular friction clutches symmetrical about said spindle, said positive clutch and one of said friction clutches including elements engaging one of said speed-control members to said spindle, said second friction clutch including elements engaging the other of said speed-control members to said spindle, first resilient means symmetrical about the spindle axis and in preloaded actuating relation with one of said friction clutches, second resilient means symmetrical about the spindle axis and in preloaded actuating relation between said positive clutch and the other of said friction clutches, and common axially movable actuating means symmetrical about the spindle axis and including abutment means in selective direct-relieving relation with said clutches against the preloaded action of said resilient means, said last-defined means disengaging said positive clutch before said first friction clutch is disengaged and before said second friction clutch is engaged.

References Cited in the file of this patent

UNITED STATES PATENTS

| Number | Name | Date |
|---|---|---|
| 888,523 | Bramley-Moore | May 26, 1908 |
| 1,120,663 | Baker | Dec. 15, 1914 |
| 1,167,012 | Neuthe Boom | Jan. 4, 1916 |
| 1,312,981 | Hambek | Aug. 12, 1919 |
| 1,435,903 | Holmes | Nov. 14, 1922 |
| 1,453,008 | Fox et al. | Apr. 24, 1923 |
| 1,739,946 | Carhart | Dec. 17, 1929 |
| 1,928,779 | Brown | Oct. 3, 1933 |
| 2,061,288 | Murray | Nov. 17, 1936 |
| 2,201,676 | Coe | May 21, 1940 |
| 2,205,989 | Meyers et al. | June 25, 1940 |
| 2,255,738 | Barkey | Sept. 9, 1941 |
| 2,387,418 | Sundt | Oct. 23, 1945 |
| 2,397,943 | Bull | Apr. 9, 1946 |
| 2,403,326 | Baker et al. | July 2, 1946 |
| 2,477,701 | McCallum | Aug. 2, 1949 |